[11] 3,612,656

[72] Inventors Juan R. M
 North Plain..
 Allen H. Meitzler, Morristown, N.J.
[21] Appl. No. 835,687
[22] Filed June 23, 1969
[45] Patented Oct. 12, 1971
[73] Assignee Bell Telephone Laboratories,
 Incorporated, Murray Hill,
 Berkeley Heights, N.J.

PATENTS

| 3,404,296 | 10/1968 | Jaffe et al. | 252/62.9 X |
| 3,512,864 | 5/1970 | Haertling et al. | 350/150 |
| 3,531,182 | 9/1970 | Land et al. | |

Primary Examiner—David Schonberg
Assistant Examiner—Paul R. Miller
Attorneys—R. J. Guenther and Arthur J. Torsiglieri

[54] FINE GRAIN POLYCRYSTALLINE FERROELECTRIC CERAMIC OPTICAL SHUTTER
8 Claims, 2 Drawing Figs.

[52] U.S. Cl. .............................................. 252/62.9 X, 350/150
[51] Int. Cl. .............................................. G02f 5/00
[50] Field of Search .................................... 252/62.9 340/173.2; 350/149–151, 157, 160

ABSTRACT: A fine grain polycrystalline ceramic, such as lanthanum doped lead zirconate-lead titanate, is used in a "latching" optical shutter ("light gate"). The electric polarization of such a ceramic has been discovered to be amenable to a simple switching cycle, that is, the ceramic can be switched from a state of prescribed remanent polarization such as saturated polarization to a state of zero remanent polarization by means of a single applied voltage pulse. With this type of switching, optical shutters (of the latch relay type) can easily and simply be constructed, since the birefringence of the ferroelectric ceramic depends upon the simply switchable electric polarization thereof.

INVENTORS: J. R. MALDONADO
A. H. MEITZLER

BY: *[signature]*

ATTORNEY

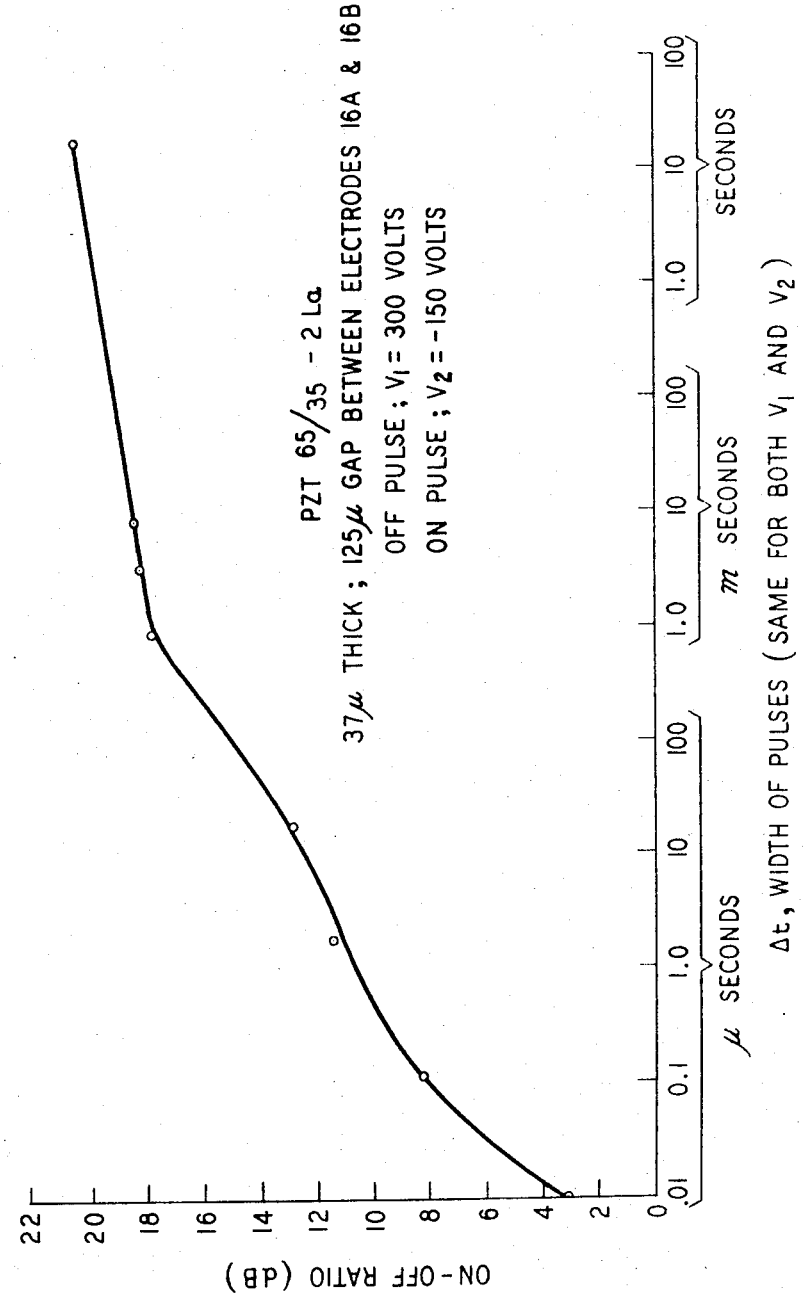

3,612,656

FINE GRAIN POLYCRYSTALLINE FERROELECTRIC CERAMIC OPTICAL SHUTTER

FIELD OF THE INVENTION

This invention relates to the field of electrical communication systems, in particular those utilizing ferroelectric devices.

BACKGROUND OF THE INVENTION

Many types of optical shutters ("light gates") have been used in the prior art of optical communication systems. The use of ferroelectric materials in the optical shutter gives rise to the possibility of an optical shutter with a memory ("latch relay light gate" or "switch").

For example, suppose a beam of light propagating in the Cartesian $z$ direction is linearly polarized at an angle of 45° with respect to the $x$ axis by means of a polarizer and this polarized beam is incident upon a ferroelectric plate whose electric dipole moment is "permanently" (remanently) polarized in the $y$ direction. Assuming that the thickness of the plate is such that the retardation corresponding to the value of the remanent polarization of the plate is an even number of half wave lengths, the emitted light beam is still linearly polarized along the $x$ axis. Thus, an analyzer set at 90° ("crossed") with respect to the polarizer will extinguish the light beam. The system is said to be in the "OFF" state. Now, if the ferroelectric can be switched, by an applied voltage pulse for example, into a different state of polarization which presents a different birefringence to the incident light beam, then the analyzer will no longer extinguish the light beam. The system is then said to be in the "ON" state. Thus, the system would provide a simple optical shutter with a memory.

However, ordinary ferroelectric crystals can be switched with a single voltage pulse only from a first state of remanent polarization in one direction into a second state of remanent polarization in the opposite direction. Since these two states of remanent polarization present the same birefringence to the light beam, such crystals cannot be used in the simple optical shutter system described above, unless a rather complex and carefully controlled multiple sequence of voltage pulses is applied to the ferroelectric crystal. Such a sequence of voltage pulses requires rather complex and expensive control circuitry.

C. E. Land has discovered that a thin plate of lead zirconate-lead titanate ceramic behaves as a uniaxial crystal when poled in some particular direction. The birefringence of the plate has been found to vary approximately as the square of the remanent polarization. Therefore, if the polarization can be varied between zero and saturation, a maximum change in birefringence and hence optical phase retardation can be obtained. This change, as mentioned before, is not easily obtained with single crystal materials.

SUMMARY OF THE INVENTION

We have discovered that the switching characteristics of fine grain (i.e., approximately 2 micron or less in grain size) ferroelectric ceramics differ significantly from the switching characteristics of ferroelectric single crystals (e.g., barium titanate, triglycine sulphate); and that the remanent polarization of a fine grain ceramic plate can be switched from a first state of remanent polarization to a second state of a different remanent polarization (including zero average polarization) by simply applying a voltage pulse of controlled magnitude. Moreover, the value of the remanent polarization remaining in the fine grain ferroelectric ceramic subsequent to an applied voltage pulse depends only upon the height of the pulse and not upon the width of the pulse, so long as this width exceeds a certain value, typically 1 millisecond. Thus, since the first and second intermediate states of the fine grain ferroelectric ceramic present different degrees of birefringence to an incident light beam propagating in the $z$ direction, a simply constructed latch relay type of light switch can be fabricated with this type of ceramic in conjunction with "crossed" polarizers and analyzers. A variable phase retarder can also similarly be constructed therefrom, provided the polarization is established by appropriate electric fields at variable intermediate polarization states.

In a particular embodiment of this invention, a fine grain ferroelectric ceramic plate is chosen consisting of 65 percent lead zirconate and 35 percent lead titanate by weight with 2 atomic percent lanthanum added as lanthanum oxide (PZT 65/35−2% La). After suitable preparation including prepoling of the crystal, as described in detail below, metallic electrodes of indium are deposited on one major surface of the ceramic. This ceramic is placed between a crossed polarizer and analyzer pair. A beam of light is incident upon the polarizer and is transmitted through the ceramic plate and the analyzer. Advantageously, the thickness of the ceramic and the orientation thereof is selected such that the optical path difference between the ordinary and extraordinary rays (if equal intensity) propagating through the ceramic is an integral number of wave lengths after a sufficiently long and strong pulse of voltage applied to the electrode has carried the fine grain ferroelectric ceramic into a state of maximum (saturated) remanent polarization. At this time, the analyzer extinguishes the beam of the light and the system is said to be in the "OFF" condition. At a preselected time, another voltage pulse of suitable height and width, but of opposite algebraic sign from the previous pulse, is applied to the electrodes. Thereafter the ferroelectric ceramic is in a state of zero average remanent polarization and presents a different optical path difference for the ordinary and extraordinary rays propagating therethrough. Thus, the light beam emerges from the ceramic elliptically polarized, in general. Therefore, some of this light passes through the analyzer and is collected for utilization by a photomultiplier. Thus, the system furnishes a latch relay type of optical shutter.

Advantageously, the OFF condition is characterized by a smaller amount of light scattering than the ON condition, in order to achieve a greater ON-OFF ratio. This can be obtained by selecting the thickness of the ceramic such that in the OFF condition the state of polarization thereof corresponds to the smaller amount of scattering, thereby yielding an OFF condition which is characterized by more nearly perfect extinction of the light beam by the analyzer.

This invention, together with its advantages, features, and objects may be better understood from a reading of the following detailed description in conjunction with the drawing in which:

FIG. 3 shows a plot of ON-OFF intensity ratios obtained in a particular mode of operation of a particular embodiment of the optical shutter system shown in FIG. 1.

DETAILED DESCRIPTION

Figure 1:
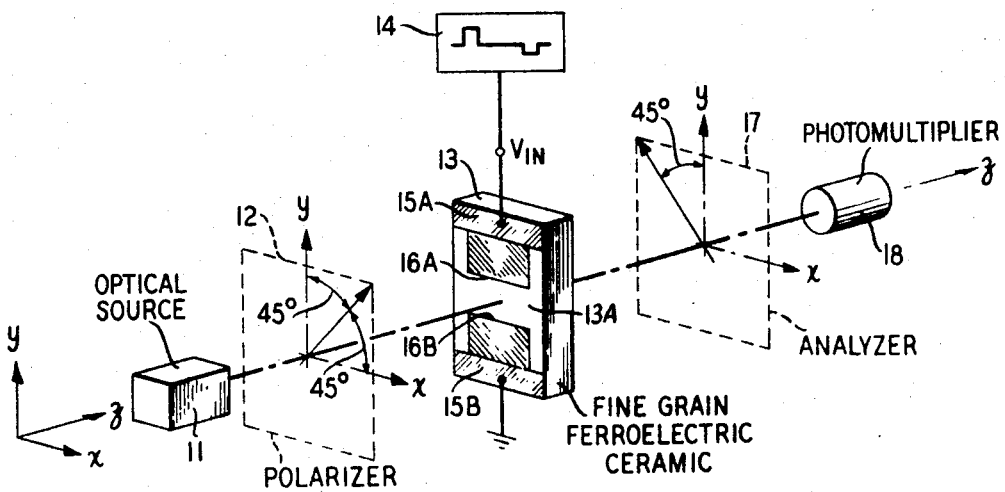
FIG. 1 shows a latch relay optical shutter system including a fine grain ferroelectric ceramic plate according to this invention.

As shown in FIG. 1, an optical source 11 such as a Helium-Neon laser furnishes a beam of unpolarized light propagating in the $z$ direction. A polarizer 12 transmits only that plane of electric polarization of the beam which makes an angle of 45° with both the $x$ and the $y$ axes. The beam then passes through a fine grain ferroelectric ceramic plate 13. An input voltage pulse signal $V_{IN}$ from a pulse voltage source 14 is supplied across a major surface 13A of the ceramic plate 13 by means of aluminum electrodes 15A and 15B in physical contact with indium electrodes 16A and 16B. The light emerging from the ceramic plate 13 traverses an analyzer 17 which is set at an angle of 90° ("crossed") with respect to the polarizer 12. Then the light is collected for utilization by a photomultiplier 18.

Figure 2:
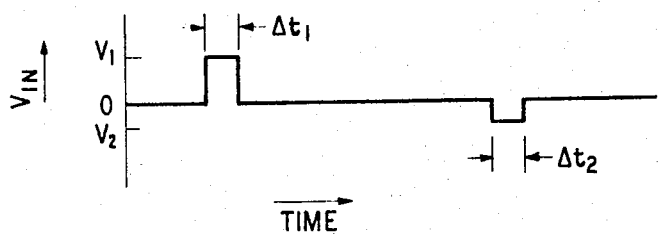
FIG. 2 shows a plot of voltage pulse inputs to the ceramic to explain a mode of operation of the system shown in FIG. 1.

As shown in FIG. 2, a first pulse of height $V_1$ and duration $\Delta t_1$ is applied by the pulse voltage source 14 to the electrodes 15A and 15B. The electric field in the y direction created thereby in the ceramic plate 13 between the electrodes 16A and 16B switches this plate 13 into a first state of maximum average remanent polarization. Some arbitrarily prescribed time later, a second pulse of height $V_2$ and duration $\Delta t_2$ is applied to the plate 13 by the pulse source 14; thereafter the plate 13 is in a second state of zero average remanent polarization. The birefringence property of the plate 13 in the first state differs of course from that in the second state. The thickness of the ceramic plate 13 is selected such that, in the OFF condition wherein the ceramic plate is in the first state of maximum average polarization, the birefringence of this plate 13 causes the plane of polarization of the light beam to be "rotated" by 180° or integral multiple thereof (i.e., an even number of half wavelengths retardation). In this OFF condition, the analyzer 17 extinguishes the light beam with minimum background due to scattering in the ceramic plate 13. In the second state of polarization of the ceramic plate 13, i.e., subsequent to the second pulse $V_2$, the light beam is at least partially transmitted by the analyzer 17 and is collected for utilization by the photomultiplier 18.

The fine grain ferroelectric ceramic 13, for example PZT 65/35—2 percent La. of nominal grain size of approximately 1 micron as obtained from Clevite Corporation, is initially in the form of disks about 9.5 mm. in diameter and 0.38 mm. thick. The disks are lapped to a final thickness of 37 microns with the final lapping providing an optical polish to both sides. The thin disks are sliced into the shape of rectangles about 5×2.5 mm. and annealed in air at 700° C. for 10 minutes. They are then cooled slowly through the Curie point (330° C.) to avoid thermal shock. Two aluminum electrodes 15A and 15B are evaporated on one face of the rectangularly shaped fine grain ceramic plate 13, spaced apart to form a gap of about 1.5 mm. therebetween. The rectangular plate 13 is then prepoled by applying a field of about 20 kv./cm. at an elevated temperature of about 150° C. Finally, indium electrodes 16A and 16B are evaporated on the same face of the plate 13 as the aluminum electrodes 15A and 15B to be in contact respectively thereto, as shown in FIG. 1, leaving a gap of about 125 $\mu$ along a channel 1 mm. wide. The finished samples are mounted on Teflon holders (not shown), which serve to reduce leakage currents between connecting leads and to furnish mechanical support.

FIG. 2 shows a typical plot of $V_{IN}$ vs. time, where $V_{IN}$ is the input voltage applied to the electrodes 15A and 15B, in a particular mode of operation of the system shown in FIG. 1. Typically, the pulse $V_1$ has a height of about 300 volts and a width $\Delta t_1$ of 1 millisecond or more; whereas the pulse $V_2$ has a height of 150 volts and a width $\Delta t_2$ also of 1 millisecond or more. In the aribitrarily prescribed time interval between the pulses $V_1$ and $V_2$, the system pictured in FIG. 1 is in the OFF condition and the light beam is extinguished by the analyzer 17; whereas subsequent to the pulse $V_2$ the system is in the ON condition and the light beam is partially transmitted by the analyzer 17. Thus, the system shown in FIG. 1, as operated with the input voltage shown in FIG. 2, furnishes a latch relay type of optical shutter.

It should be understood that a compensator (not shown), of the Babinet-Soeil type for example, can be placed anywhere between the polarizer 12 and the analyzer 17. This compensator, as known in the art, is useful for obtaining any amount of additional "bias" to the birefringent path encountered by the light beam.

Using the system shown in FIG. 1 in the mode of operation shown in FIG. 2, FIG. 3 shows a plot of results obtained for the ON-OFF intensity ratio vs. the time intervals $\Delta t$. Here $\Delta t$ represents the equal duration of both pulses $V_1$ and $V_2$, i.e., the case where $\Delta t = \Delta t_1 = \Delta t_2$. A "knee" in the curve shown in FIG. 3 at about 1 millisecond indicates that the pulse widths $\Delta t_1$ and $\Delta t_2$ are not critical so long as they exceed 1 millisecond. Therein lies the key to the advantage of the fine grain ferroelectric ceramics, in contradistinction to other ferroelectrics lacking such a feature. This "knee" indicates that so long as the pulse widths $\Delta t_1$ and $\Delta t_2$ exceed a value of about 1 millisecond, the ON-OFF ratio will exceed about 18 decibels, provided the pulse heights $V_1$ and $V_2$ are appropriately though noncritically selected.

It should be obvious that the system shown FIG. 1 can also be used as a voltmeter which measures the maximum voltage in a voltage waveform applied to the electrodes 16A and 16B from the source 14. This is true so long as the significant Fourier components of the waveform correspond to a Fourier frequency of $10^3$ per second or less, and the waveform is solely positive or negative.

It has also been found that by repeating the above-described heating and prepoling process of preparation of the ceramic plate 13 followed by a single annealing, a "superpoled" ceramic is obtained which can be switched between a state of zero and saturated remanent polarization by a voltage pulse source in which $V_1 = -V_2$. Thereby the voltage pulse source circuitry can be somewhat simplified over that required for the case $V_1 = -2V_2$ described above, that is, $V_1 = 300$ volts and $V_2 = -150$ volts.

Moreover, in an $xy$ addressable ferroelectric array, the use of the fine grain "superpoled" ferroelectric ceramic prepared as described above, makes possible far less "crosstalk" between the single addressed location and the many nonaddressed locations with the same $x$ or $y$ coordinate than in the case of ferroelectric single crystals in the prior art. This is due to the fact that, as compared to the single crystal ferroelectric, in the case of a "fine" grain ferroelectric ceramic, a pulse height $V_1/2$ applied to the nonaddressed location does not affect the state of polarization nearly as much as the pulse height $V_1$ applied to the addressed location. This, in turn, is due to the fact that in a single crystal ferroelectric a pulse height $V_1/2$ persisting for a sufficiently long period of time will completely switch the single crystal ferroelectric into a saturated state of remanent polarization; whereas in the case of a fine grain ferroelectric ceramic, a pulse height $V_1/2$ persisting for the same or even longer period of time will only carry the fine grain ferroelectric ceramic into some intermediate state of remanent polarization.

While the use of indium for the metallic electrodes 16A and 16B has been found to enable a total of over $10^9$ switching cycles of the ceramic plate 13, other metals can be used instead of indium. Moreover, the electrodes 15A and 15B can be also advantageously made of gold-chrome or any other stable metals or alloys known in the art instead of aluminum.

Although the preferred material for the ferroelectric plate 13 is lanthanum doped lead zirconate titanate (PZT), other materials can also be used for this plate 13. For example, bismuth doped PZT can also be used as the ferroelectric, although it has been found to yield less birefrigence than lead doped PZT. Moreover, other fine grain ferroelectric ceramics may also be used therefor, as they become available in the art.

1. A light gate which comprises:
  (a) a fine grain ferroelectric ceramic plate;
  (b) two metallic electrodes located on a single major surface of the plate, defining a gap therebetween;
  (c) means for applying two voltage pulses to the electrodes in order to create an electric field in the gap, characterized in that first of the pulses is of one algebraic sign and and the second of the pulses is of the opposite algebraic sign, the heights of said pulses being such that the electric polarization of the plate is switched by the second of the pulses from a first to a second state of polarization, the second state characterized by substantially zero average remanent polarization and the first state characterized by a substantially saturated remanent polarization.

2. A light gate according to claim 1 in which the plate consists essentially of lead zirconate-lead titanate.

3. A light gate according to claim 2 in which the ratio by weight of lead zirconate to lead titanate is approximately 65 to 35.

4. A light gate according to claim 2 in which the lead zurcinate-lead titunate is doped with approximately 2 atomic percent lanthanum.

5. A light gate according to claim 1 which further comprises an analyzer and a polarizer each of which is situated on either side of the major surface of the plate.

6. A light gate according to claim 5 which further comprises an optical source of a beam of light incident upon the analyzer.

7. A light gate according to claim 1 in which the ferroelectric ceramic plate is prepoled, and the height of the second voltage pulse is approximately one-half the height of the first pulse.

8. A light gate according to claim 1 in which the ferroelectric ceramic plate is superpoled, and the height of the second pulse is approximately equal to the height of the first pulse.